Dec. 31, 1940.  K. SCHLESINGER  2,227,037

TESTING GENERATOR FOR IMAGE REPRODUCING SYSTEMS

Filed Oct. 7, 1938

Inventor:

Patented Dec. 31, 1940

2,227,037

UNITED STATES PATENT OFFICE 2,227,037

TESTING GENERATOR FOR IMAGE REPRODUCING SYSTEMS

Kurt Schlesinger, Berlin, Germany, assignor, by mesne assignments, to Loewe Radio, Inc., a corporation of New York Application October 7, 1938, Serial No. 233,814
In Germany November 24, 1937

1 Claim. (Cl. 250—41.5)

The present invention is directed to a photo-electric testing generator, more particularly for measuring the reproduction of light-intensity gradation in image reproducing systems, for example in television receiving tubes or in television transmission systems. The arrangement according to the invention permits in simple fashion of the proper checking of the gradation range of an image reproducing system.

According to the invention, the photo-electric testing generator supplies a step-like graduated signal, which is repeated synchronously to the mains frequency for example 25 times per second. The signal itself consists, for example, of 20 steps increasing in intensity by equal amounts which correspond to the single light-intensity values from extreme black to extreme white of the gradation range of the image reproducing system, i. e. the intensity of the single graduations of the signal corresponds to the different light-intensity values between black and white. With an intensity of the complete signal amounting to 100 volts each step in the case of a 20-step graduation is 5 volts higher than the preceding step. The graduation of the signal is brought about by the use of a diaphragm, this diaphragm being so stepped about its periphery that the desired light-intensity graduation is obtained. The diaphragm can be so designed, for example, that an arithmetical graduation of the light intensity takes place, but it is also quite readily possible to obtain a desired graduation of the testing signal by the use of a diaphragm cut in other fashion. Thus, for example, there may also be produced a logarithmic testing signal, in which, therefore, the height of the steps increases from black to white in proportion to the value of the potential (psychological curve).

Figure 1:
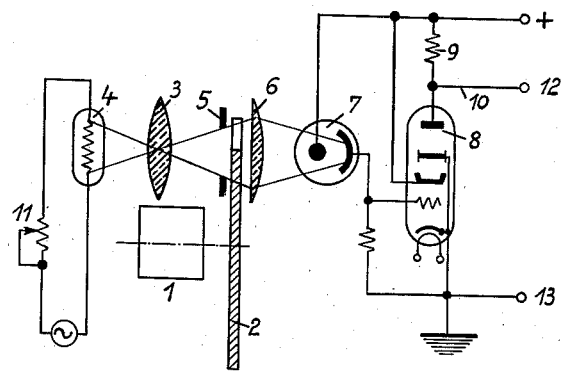
Figure 2:
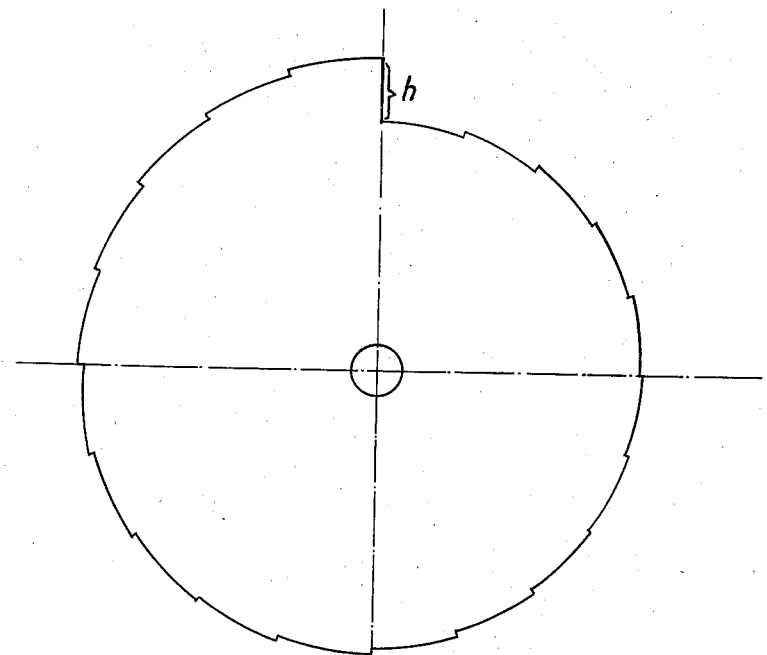

The design of the photo-electric testing generator according to the invention is to be seen in Figs. 1 and 2. Fig. 1 shows diagrammatically the arrangement according to the invention, a synchronous motor 1 driving the diaphragm disc 2 shown on a larger scale in Fig. 2, which is cut on the periphery in accordance with the desired graduation of the testing signal. The edge of the diaphragm disc 2 consists of circular arcs of successively increasing radius connected by short radial line segments. On the diaphragm disc 2 there is reproduced by means of an optical system 3 the filament of an incandescent lamp 4, in which connection the intensity of the light of the filament can be adjusted by means of a regulating resistance 11. By means of a diaphragm 5, which is arranged in front of the diaphragm disc, the image of the filament is limited in such fashion that the length of the filament is equal to the height of the jump $h$ in the covering spiral (see Fig. 2), corresponding to which the diaphragm disc is formed at its edge. By means of a lens 6 the light transmitted by the diaphragm disc 2 is concentrated on to the photo-cell 7. The fluctuations in potential which occur in the output circuit of this photo-cell 7 are conducted to a suitable tube amplifier 8. There is shown by way of example in the present case a normal power-amplifier pentode. The photo-cell circuit is connected up with the amplifier in such fashion that with an increase of the light impinging on the photo-cell the positive potential at the resistance 9 also increases. The resistance 9 is approximately of the order of 5,000 ohms, which value also permits of the provision of comparatively long leads between the output terminals 12—13 and the apparatus to be connected.

In Fig. 2 there is shown in plan a possible embodiment of the diaphragm disc, viz. a disc for arithmetical graduation of the testing signal. The height of the jump of the spiral is $h$, which corresponds to the length of the filament 4.

The operation of the arrangement according to the invention is such that a signal, which is graduated in certain fashion in its light intensity values, is generated without any kind of mechanically moved contacts, i. e. without wear in continuous operation. The signal, which is suitable for the control of electronic tubes of all kinds, i. e. also, for example, for the modulation of transmitters, has the property that the half-tone value zero, i. e. the black in the image, is always maintained constant, i. e. the maximum amplitude is adjusted by adjustment of the light intensity of the lamp 4 by means of the resistance 11. If, for example, a television receiver deflected synchronously to the lighting mains is connected with the output terminals 12/13 of the testing generator according to the invention, it is possible to determine in proper fashion from the image appearing on the image reproducing tube whether the gradation range of the image reproduction is adequate. If there appears on the image reproducing tube a signal which is clearly graduated in accordance with the graduations of the diaphragm disc, the half-tone reproduction of the image reproducing tube is beyond objection. If these graduations in the light intensity are not clearly discernible, the image reproducing tube is deficient. In this way there can be checked in simple fashion the quality of the image reproducing system.

The length of the characteristic of the amplifier employed in the testing generator according to the invention should be so chosen that a distortion of the linearity of the steps by reason of over-control is unable to take place even in the case of the maximum adjustable light intensity of the filament 4.

I claim:

An electrical signal generator system comprising a disk element having its periphery formed as a series of arcs of concentric circles each of uniformly and progressively increasing radius and having each arc subtend a substantially equal angle, a light source and means to direct the light from said source towards the disk so as to illuminate a peripheral zone thereof which is measured in a radial direction on the disk by a distance at least as great as the difference between maximum and minimum disk radius and which is measured in a circumferential direction by a distance less than that of the arc subtended by any of the substantially equal angles, a light responsive cell arranged to receive the light from said source which passes from the zone of illumination beyond the periphery of the disk, means to rotate the disk so as to change the light reaching the said cell from a state of maximum revealment to a state where the light is eclipsed to a maximum extent during at least a single rotation of the disk and for causing the change between minimum and maximum light on the said cell to occur in one of the two directions of change in an abrupt manner and to occur in the other of the two directions of change in a progressive manner, and a load circuit connected to the light responsive cell for utilizing the developed output energy.

KURT SCHLESINGER.